(12) United States Patent
Jahromi

(10) Patent No.: US 11,468,217 B2
(45) Date of Patent: Oct. 11, 2022

(54) PREDICTION OF PIPELINE COLUMN SEPARATIONS

(71) Applicant: Vanmok Innovations Holding Inc., Edmonton (CA)

(72) Inventor: Hamed Ghasvari Jahromi, Edmonton (CA)

(73) Assignee: Vanmok Innovations Holding Inc., Edmonton (CA)

(*) Notice: Subject to any disclaimer, the term of this patent is extended or adjusted under 35 U.S.C. 154(b) by 0 days.

(21) Appl. No.: 17/502,075

(22) Filed: Oct. 15, 2021

(65) Prior Publication Data
US 2022/0253581 A1 Aug. 11, 2022

Related U.S. Application Data

(63) Continuation of application No. 17/408,555, filed on Aug. 23, 2021.

(60) Provisional application No. 63/147,169, filed on Feb. 8, 2021.

(51) Int. Cl.
*G06G 7/48* (2006.01)
*G06F 30/28* (2020.01)
*G06N 5/02* (2006.01)

(52) U.S. Cl.
CPC .............. *G06F 30/28* (2020.01); *G06N 5/02* (2013.01)

(58) Field of Classification Search
CPC ............ G06F 30/28; G06F 30/20; G06N 5/02
See application file for complete search history.

(56) References Cited

U.S. PATENT DOCUMENTS

2020/0159976 A1* 5/2020 Kumar ................... G06F 30/20
2022/0011275 A1* 1/2022 Bohorquez Arevalo ...................
F17D 5/00

FOREIGN PATENT DOCUMENTS

GB 2496483 B * 9/2019 .............. F16L 55/00

OTHER PUBLICATIONS

Jahromi, HG, Roxas, M, & Mokamati, S. "Column Separation in a Shut-In Liquid Hydrocarbon Transmission Pipeline." Proceedings of the 2018 12th International Pipeline Conference. vol. 3: Operations, Monitoring, and Maintenance; Materials and Joining. Calgary, Alberta, Canada. Sep. 24-28, 2018. (Year: 2018).*
Adamkowski, A., and Lewandowski, M. (Jun. 19, 2009). "A New Method for Numerical Prediction of Liquid col. Separation Accompanying Hydraulic Transients in Pipelines." ASME. J. Fluids Eng. Jul. 2009; 131(7): 071302. https://doi.org/10.1115/1.3153365 (Year: 2009).*

(Continued)

*Primary Examiner* — Rehana Perveen
*Assistant Examiner* — Nithya J. Moll
(74) *Attorney, Agent, or Firm* — Michael D. Eisenberg

(57) ABSTRACT

An example operation may include one or more of acquiring real-time parameter data from a pipeline, selecting relevant real-time parameters from the real-time parameter data, executing a plurality of equations using the selected real-time parameters as an in input, generating a model configured to simulate the pipeline in real-time based on an output of the plurality of the equations, and predicting at least one location of a column separation in the pipeline based on the model.

17 Claims, 11 Drawing Sheets

(56) References Cited

OTHER PUBLICATIONS

Jahromi, Hamed Ghasvari, Ekram, Fatemeh, Roxas, Michael, and Satya Mokamati. "A Mathematical Model for the Spatial Prediction and Temporal Evolution of the Column Separation in a Flowing Hydrocarbon Transmission Pipeline." Paper presented at the PSIG Annual Meeting, London, UK, May 2019. (Year: 2019).*

Lagoni, Per, Saavedra, Enrique, and Jerry Roberts. "Successful Implementation of a Real-Time Pipeline Modeling System." Paper presented at the PSIG Annual Meeting, Albuquerque, New Mexico, Oct. 1995. (Year: 1995).*

\* cited by examiner

PREDICTION OF PIPELINE COLUMN SEPARATIONS

CROSS-REFERENCES TO RELATED APPLICATIONS

The present application is a continuation of U.S. patent application Ser. No. 17/408,555 filed on Aug. 23, 2021, which claims priority from U.S. Provisional Application Ser. No. 63/147,169 filed on Feb. 8, 2021, both of which are hereby incorporated herein by reference in their entirety.

BACKGROUND

This application generally relates to monitoring current state of a pipeline, and more particularly, to simulation of a pipeline for prediction of column separations.

Real-time models of fluid flow in a pipeline can be used to find the location of a leak in the pipeline or to predict damage to the pipeline. More specifically, real-time knowledge in space and time of the phase change of a fluid in the pipeline between liquid and gaseous phases is paramount in identification of the location of the leak or in identification of locations of the pipeline that are likely to be damaged.

Real-time transient modeling (RTTM) for the leak detection in pipelines is commonly used. However, conventional models of liquid dynamics in a pipeline predict the inception of column separation in space only and cannot predict the evolution of the changed phase in space and time. This imposes serious limitations for reliable leak detection in the pipelines using the existing RTTM models.

Two-phase flow occurs in reference to the coexistence of two phases of the same substance in the flow. Conventional models had ignored the importance of this matter in its generality in compensation for what had been possible at the time of developments of these models or by a different consideration of multiphase in their formulation, they have defined the phases not to be another state of matter of the same substance but instead to be various matters in different phases. This means that rather than having mathematical terms in their model to take care of phase change from liquid to vapor and vice versa in an explicit manner, they completely ignored the interfacial mass transfer. Modeling such flow is complicated by a variety of factors:

(i) Turbulent nature of such flows.

(ii) Inevitable need of averaging techniques to model the mean flow, distribution of the phase means that another averaging must also be done to create average variables such as void fraction.

(iii) A further complication is that when boiling occurs, small bubbles nucleated as the wall may detach and may be transported within the fluid.

Initially, the liquid away from the walls may still be sub-cooled (<T(Boiling)) so that the heat transfer to the vapor is predominantly provided from the wall. When the liquid reaches saturation and becomes slightly superheated, the state of bubbly flow evolves by virtue of bubble coalescence and evaporation at bubble interfaces to a state known as a slug flow. The slug flow is formed from plugs of gas filling the pipeline with slogs of bubbly fluid. More irregularities leading to a confined film of annularly distributed liquid and a core of gas flow can occur by the continued evaporation.

Aside from theoretical approaches on the bubble growth and collapse in a liquid (C. E. Brennen, 2005, Fundamentals of Multiphase Flows, Cambridge University Press) and the bubble dynamics of two-phase flow (N. I. Kolev, 2011, Multiphase Flow Dynamics, Thermal and Mechanical Interactions, Springer-Verlag Berlin Heidelberg), there have been many experimental and computational efforts to study column separation and the still limited number of data available to develop design criteria (A. Bergant, A. R. Simpson, A. S. Tijsseling, 2006, "Water hammer with column separation, A historical review", Journal of Fluids and Structures, 22, pp 135-171).

Safwat (H. H. Safwat, 1972, Transients in cooling water systems of thermal power plants, Ph.D. Thesis, Delft University of Technology) employed high-speed photography to visualize liquid column separation downstream of a valve in a short horizontal pipeline (approximately 40 meters in length and 100 mm in diameter). Safwat then used a discrete bubble model to investigate the water column separation numerically. In a simple reservoir-pipe-valve system, Martin (C. S. Martin, 1983, "Experimental investigation of column separation with rapid closure of downstream valve", Proc. 4th Conf. on Pressure Surges. British Hydromechanics Research Association, Cranfield, U.K., pp 77-88) examined the cavitations formation along the pipe and tried to classify column separation intensity. His experimental results showed that maximum pressure in a pipe could exceed the Joukowsky pressure rise.

There are various one-dimensional numerical models developed to model the column separation: the discrete multi-cavity model, discrete gas cavity model and the two-phase flow model and shallow water model. The discrete vapor cavity model, the most used model for column separation studies, incorporates the vaporous cavitations within the method of characteristics (V. L. Streeter, E. B. Wylie, 1967, "Hydraulic Transients", McGraw-Hill, New York; E. B. Wylie, V. L. Streeter, 1993, "Fluid Transients in Systems", Prentice-Hall, Englewood Cliffs) used in the fluid transient analysis in pipelines. Cavities were confined to form at the computational grid points if the computed pressure fell below the liquid's vapor pressure. For the liquid between computational grid points, the pressure wave travels with a constant acoustic wave. Upon forming a cavity, the computational grid point was treated as a fixed internal boundary condition, and the pressure was set equal to the liquid's vapor pressure until the cavity collapsed (E. B. Wylie, V. L. Streeter, 1978, "Column separation in horizontal pipelines", Proceedings of the Joint Symposium on Design and Operation of Fluid Machinery, Vol 1, IAHR/ASME/ASCE, Colorado State University, Fort Collins, USA, pp 3-13). This method was employed for water hammer analysis in a 110 km pipeline (E. P. Evans, P. V. Sage, 1983, "Surge analysis of a large cavity pipeline", Proceedings of the Fourth International Conference on Pressure Surges, BHRA, Bath, UK, pp 39-57).

Further development of the model to incorporate cavitation inception with negative absolute pressure waves was presented in A. Bergan, A. R Simpson (1999, "Cavitation inception in pipeline column separation", Proceedings of the 28th IAHR Congress, Graz, Austria). One of the major deficiencies of the discrete vapor cavity was the existence of numerical oscillations generated during the existence of multi-cavities in the pipeline (A. H. De Vries, "Cavitation due to water-hammer in horizontal pipelines", Deflt Hydraulics Laboratory, Report M 1116, Delft, The Netherlands; E. B. Wylie, 1984, "Simulation of vaporous and gaseous cavitation", ASME Journal of Fluid Engineering, 106, pp 307-311).

A remedy to this deficiency was to consider small amounts of initial gas at the computational grid points to suppress the numerical oscillations (E. B. Wylie, 1984, "Simulation of vaporous and gaseous cavitation", ASME Journal of Fluid Engineering, 106, pp 307-311; A. H. De Vries, "Cavitation due to water-hammer in horizontal pipelines with several high points", Deflt Hydraulics Laboratory, Report M 1151, Delft, The Netherlands).

This led to the construction of the discrete gas cavity model (E. B. Wylie, V. L. Streeter, 1993, "Fluid Transients in Systems", Prentice-Hall, Englewood Cliffs; E. B. Wylie, 1984, "Simulation of vaporous and gaseous cavitation", ASME Journal of Fluid Engineering, 106, pp 307-311; and G. A. Provoost, E. B. Wylie, 1981, "Discrete gas model to represent distributed free gas in liquids", Proceedings of the Fifth International Symposium on Water Column Separation", IAHR, Obernach, Germany, 8pp) a generalized formulation to distributed vaporous cavitations modeling. The model was able to provide maximum pressures predictions in good agreement with experimental data (G. Barbero, C. Ciaponi, 1991, "Experimental validation of a discrete free gas model for numerical simulation of hydraulic transients with cavitation", Proceedings of the International Meetings on Hydraulic Transients with Water Column Separation", Valencia, Spain, pp. 51-69; A. R. Simpson, 1986, "Large water hammer pressures due to column separation models", Ph.D. Thesis, The University of Michigan, Department of Civil Engineering, Ann Arbor, USA) and could exhibit nonlinear variable wave speed features of the physics (J. C. P. Liou, 2000, "Numerical properties of the discrete gas cavity model for transients" ASME Journal of Fluid Engineering, 122, 636-639). However, the model would still suffer from adequate predictions of the frequency of repeated cavity formation and collapse. Kalkwijk and Kranenburg (J. P. Th. Kalkwijk, C. Kranenburg, 1971, "Cavitation in horizontal pipelines due to water hammer", Journal of Hydraulic Division, ASCE, vol. 97, no. HY10, pp. 1585-1605; C. Kranenburg, 1974, "Transient Cavitation in pipelines", Ph.D. Thesis Laboratory of Fluid Mechanics, Communications on Hydraulics, Department of Civil Engineering, Delft University of Technology, Report No. 73-2 20. J. Siemons, 1967, The phenomenon of cavitation in a horizontal pipe-line due to a sudden pump-failure, IAHR Journal of Hydraulic Research 5, pp 135-152) employed two-phase flow approach to develop a bubble model for description of the distributed vaporous cavitations in a horizontal pipeline. The dynamic behavior of gas bubbles was used in their first attempt, however, the model failed to provide reasonable predictions when the bubble radii exceeded a critical value. Consequently, they developed a second approach to the phenomenon to distinguish between regions with and without cavitations. This approach successfully merged the water hammer region to the vaporous region with a shock formation when the cavity stopped growing. Kranenburg further developed a simplified one-dimensional model, known as simplified bubble flow model. Kranenburg pointed that one of the difficulties in using the method of characteristics was the pressure dependence of the wave celerity because of the presence of free gas.

Shallow water flow was employed by several researches (R. A. Baltzer, 1966, A study of column separation accompanying transient flow of liquids in pipe, Ph.D. Thesis, The University of Michigan, Ann Arbor, Mich., USA; and N. J. Mardsen, J. A. Fox, 1976, "An alternative approach to the problem of column separation in an elevated section of pipeline", Proceedings of the Second International Conference on Pressure Surges, BHRA, London, UK, pp 1-13) to develop a shallow water model (also known as separated flow model) of liquid column separation. Vapor bubbles after formation were assumed to quickly rise and agglomerate to form a single long thin cavity compared to the diameter of the pipe when the pressure reached the vapor pressure. These early attempts were not successful in their predictions as Baltzer's model (N. J. Mardsen, J. A. Fox, 1976, "An alternative approach to the problem of column separation in an elevated section of pipeline", Proceedings of the Second International Conference on Pressure Surges, BHRA, London, UK, pp 1-13) could not predict high pressure rises found in experiments and Siemon's results (J. Siemons, 1967, The phenomenon of cavitation in a horizontal pipe-line due to a sudden pump-failure, IAHR Journal of Hydraulic Research 5, pp 135-152) suffered from a mass imbalance at the boundary of the cavity and existence of gravity waves (J. P. Th. Kalkwijk, C. Kranenburg, 1971, "Cavitation in horizontal pipelines due to water hammer", Journal of Hydraulic Division, ASCE, vol. 97, no. HY10, pp. 1585-1605, C. Kranengburg, 1974, "Transient Cavitation in pipelines", Ph.D. Thesis Laboratory of Fluid Mechanics, Communications on Hydraulics, Department of Civil Engineering, Delft University of Technology, Report No. 73-2 20. J. Siemons, 1967, The phenomenon of cavitation in a horizontal pipe-line due to a sudden pump-failure, IAHR Journal of Hydraulic Research 5, pp 135-152) which could limit the validity of the results on generation of high pressures. However, Vreudgenhil's (C. B. Vreugdenhil, A. H. De Vries, J. P. The. Kalkwijk, C. Kranenburg, 1972, "Investigation into cavitation in long horizontal pipelines caused by water hammer", In Transactions of the sixth IAHR symposium Section for Hydraulic Machinery, Equipment and Cavitation, Rome, Italy, Paper J3 experimental results for a horizontal pipe of 1450 meters showed that there was an adequate agreement between the experimental results and those predicted by the separated flow model of Seimon and bubble flow model of Kalkwijk and Kranenburg. The simplified bubble mode was also not able to describe the entire pipeline flow in a pipeline with high points where local liquid column separation occurs (G. A. Provoot, 1976, "Investigation into cavitation in a prototype pipeline caused by water hammer", proceedings 2nd international conference on pressure surges, BHRA, Paper D3, London, September 22-24, pp. 13-29).

Modeling of column separation during extended shut-in periods demands a non-isothermal approach to capture the evolution (not only inception) of column separation during slow and gradual changes in the temperature. These conventional methods used to tackle the problems involving column separation are summarized and explained in detail at one place in the work of Bergant et al (Bergant, A.; Simpson, A. R. Pipeline column separation flow regimes. J. Hydraul. Eng. 1999, 125, 835-848). Bergant familiarized the models and described their differences in detail. Bergant examined three major conventional methodologies known (DVCM, DGCM and GIVCM) by applying them to a 37-meter-long inclined pipe model and they compared the results with a laboratory test pipe of the same length.

It is clear from their compared experimental results with these models that, all of them (DVCM, DGCM and GIVCM) are successful in predicting the onset of cavitations and its inception location. However, according to Bergant, the deviations between the laboratory experimental results obtained and the results from those models appear soon after the cavitations begin. In other words, the values of all of them compared to the experiment worsen as time passes by.

Column separation evolution is characterized by how accurately the behavior of cavities is captured in time. The prediction of column separation evolution is as important as the prediction of the column separation inception. For industrial scale pipelines, the prediction of column separation evolution becomes more important, otherwise the error would be more severe due to bigger reflection time for longer pipelines (Recall, reflection time is directly proportional to the length of the pipeline). Hence, any evolution track of transient phenomenon demands accuracies which are not observed by any of the conventional models.

Inability to predict the column separation evolution is a major drawback, based on the results presented in "Bergant, A.; Simpson, A. R. Pipeline column separation flow regimes. J. Hydraul. Eng. 1999, 125, 835-848," one may conclude that accuracy of conventional models' predictions is not reliable past the first few seconds and hence is not good enough to be used for the prediction of the column separation evolution over extended periods (such as hours and days).

From a commercial software perspective, the major models used are mainly formulated to capture the nucleation at a specific location in a finite geometry whose characteristic length is of the order of magnitudes not suitable for pipeline hydraulics. In other words, they are not for the purpose of detecting or predicting the cavitations within hydraulics of pipelines extending for tens or hundreds of kilometers. Such applications require custom mathematical modeling and numerical treatments in order to be applicable to the transmission of liquid hydrocarbon substances via internal flow in pipelines without guaranteeing the existence of any solution after the treatments. (The time spent for solution also should not make the solver to deviate from working and resulting in real-time)

As such, what is needed is an effective solution that may be used for accurate prediction of column separations in pipelines.

SUMMARY

One example embodiment provides a system that includes a processor and memory, wherein the processor is configured to perform one or more of acquire real-time parameter data from a pipeline, select relevant real-time parameters from the real-time parameter data, execute a plurality of equations using the selected real-time parameters as an in input, generate a model configured to simulate the pipeline in real-time based on an output of the plurality of the equations, and predict at least one location of a column separation in the pipeline based on the model.

Another example embodiment provides a method that includes one or more of acquiring, by a simulator node, real-time parameter data from a pipeline, selecting, by the simulator node, relevant real-time parameters from the real-time parameter data, executing, by the simulator node, a plurality of equations using the selected real-time parameters as an in input, generating, by the simulator node, a model configured to simulate the pipeline in real-time based on an output of the plurality of the equations, and predicting, by the simulator node, at least one location of a column separation in the pipeline based on the model.

A further example embodiment provides a non-transitory computer readable medium comprising instructions, that when read by a processor, cause the processor to perform one or more of acquiring real-time parameter data from a pipeline, selecting relevant real-time parameters from the real-time parameter data, executing a plurality of equations using the selected real-time parameters as an in input, generating a model configured to simulate the pipeline in real-time based on an output of the plurality of the equations, and predicting at least one location of a column separation in the pipeline based on the model.

DETAILED DESCRIPTION

Figure 1:
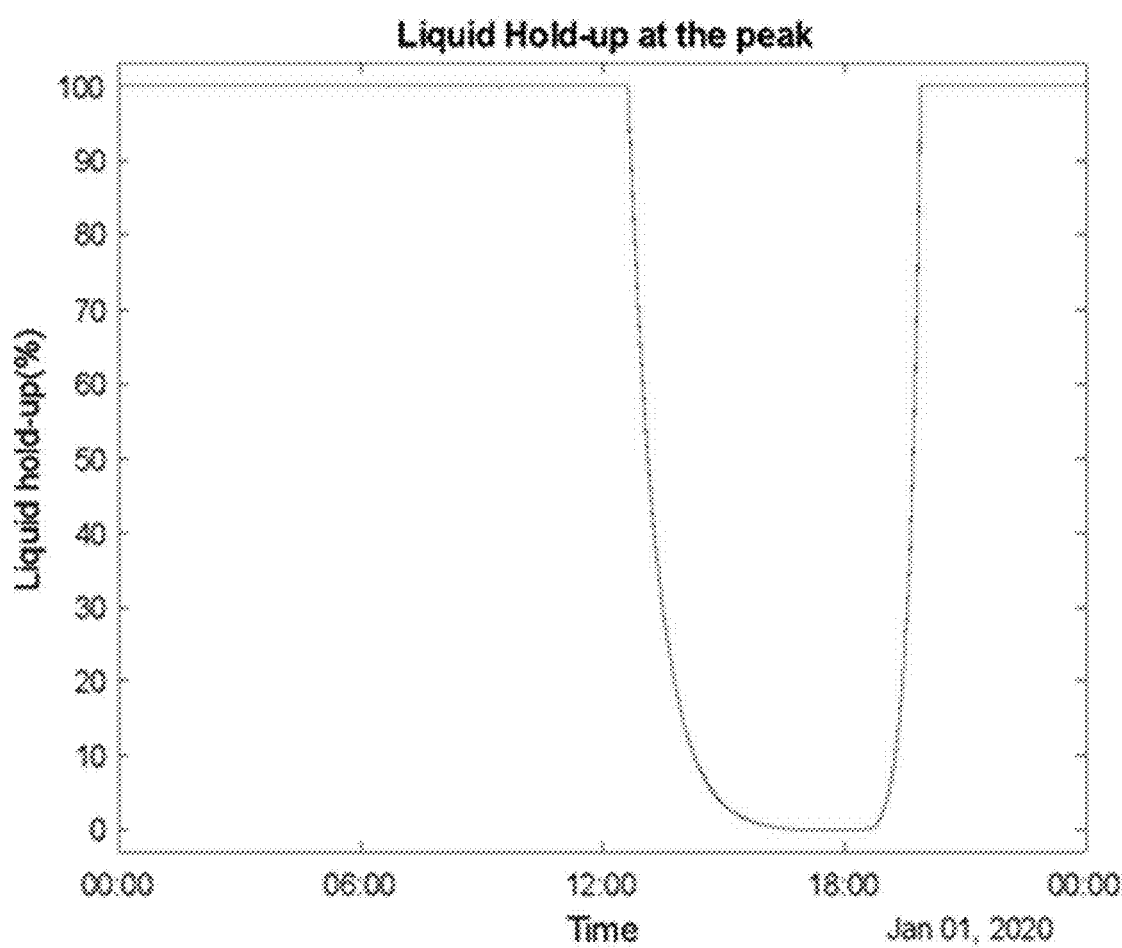
FIG. 1 shows the standing wave velocity within the pipeline at two different instances, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide for simulation of a pipeline for prediction of column separations and corresponding leaks.

The example embodiments provide for a novel RTTM model which can accurately address the phase change temporally and spatially for the pipeline. The RTTM model may include a scalar binary function to facilitate the generalization of the energy equation for pipelines where energy transfer to or from the pipeline occurs in real-time due to temperature differences between the pipeline and its surroundings. The pipelines are buried in soil at different depths. The soil may have different thermal and mechanical properties such as temperature, porosity, granular size and may be exposed to ambient environment at different daily or seasonal temperatures.

The exemplary embodiments address the column separation during extended shut-in periods which demands a non-isothermal approach to capture the evolution (not only inception) of column separation. These considerations demand a type of energy equation which is generalized to capture these effects and be included with the mass and momentum equations that have terms to allow for the interfacial mass transfer between the liquid and its vapor phase.

According to exemplary embodiments, a mathematical model is used to combine the governing equations of fluid flow based on a clear concept—to predict the flow rate, pressure, temperature and density at any given point of the pipeline in real-time based on the real-time values of those parameters acquired at both ends of the pipeline. The predictions made by this comprehensive model should not be limited to specific type of operating conditions. In other words, all physical conditions that occur in the main real pipeline should be encapsulated for analysis within the simulated model of the pipeline.

A particular use case of a pipeline in shut-in condition may demonstrate the features of the RTTM model disclosed herein. Since this use case demonstrates the challenging scenario for any pipeline and since this case is guaranteed to occur in any pipeline during its operation and since all other operating conditions are less general compared to this case, the alterations, modifications and substitutions without lack of generality are best described with bearing a picture of pipeline undergoing all known operating conditions. In one embodiment, an adaptive hybrid generalized model, method and numerical approach for all realistic operations and conditions of any industrial pipeline with arbitrary profile transporting hydrocarbon or hydrocarbon mixtures that initially enter the pipeline with liquid phase are provided.

A pipeline during shut-in period becomes a system that is closed thermodynamically. This system is not considered as a control volume with mass fluxes permitted through its control surfaces and in absence of the leakage from the pipe (i.e., if the pipeline has no leak holes in the simulations studied). Therefore, a fluid velocity may be assumed as being equal to zero everywhere in the pipeline, which stems from the assumption that a shut-in pipeline has no longitudinal motion of fluid.

However, according to the exemplary embodiments, this is not the case with a proposed novel mathematical model except for the end-point boundaries where, due to definition of shut-in, no flow in or out is allowed. When phase change is dictated by a thermo-dynamical state of the system at any location in the pipeline, local specific volume and mixture density changes attempt to set the stationary fluid inside that pipeline into motion. This is because the continuum hypothesis should not be violated at any point of the domain. This means that when the fluid must change its phase to become consistent with both surrounding conditions and thermodynamics of the equilibrium for that state of the matter (for example, due to local pressure dropping and reaching to the vapor pressure at the given temperature), it may have a dynamical effect. The cavity in vaporous form that wants to be born as the first sign of cavitation claims its volume that was previously occupied by the liquid state. Hence, the battle results in a longitudinal pressure wave that seeks elsewhere to carry its energy to, or to dissipate it on its way.

As discussed above with regard to an extended shut-in case, the dictation of temperature change is an ongoing process and so is a battle between the vaporous phase and the liquid phase trying to get its volume occupied by the vapor phase back. This may set the fluid in a pipe back into a motion longitudinally even from an initial stagnant condition.

FIG. 1 shows the standing wave velocity within the pipe at two different instances. This is a clear sign of the continuous longitudinal back and forth motion of the fluid in the pipeline during the shut-in period. The graph shows the velocity of the standing wave (in the order of magnitude of 0.1 m/s to 50 mm/s) inside the pipe after shut-in. Variable fluid flow regimes can occur at the same spot over time all the way from laminar to fully turbulent state. This means that the friction factor can change dramatically over the course of simulation at the same location due to different velocities of the fluid flow. One special period is when the stagnant fluid is set into the motion due to heat transfer. At this moment no friction factor calculation guideline is available due to the lack of knowledge of the Reynolds number.

According to one embodiment, the mathematical model may predict pressure (P), volume (Q), and temperature (T) as a function of space and time along with percentage and the intensity distribution of the liquid column at any cross-sectional area along the pipeline should two-phase fluid exist in the pipeline. Modeling of a liquid in a pipeline, according to the exemplary embodiments, is based on the following equations:

$$\frac{D\rho}{Dt} + \rho \nabla \cdot u = \sigma \tag{1}$$

$$\frac{\partial \rho}{\partial t} + \nabla \cdot (\rho u) = \sigma \tag{2}$$

$$c = \sqrt{\left(\frac{\partial P}{\partial \rho}\right)_s} \tag{3}$$

$$c = \sqrt{\frac{k_l}{\rho_l + \frac{Dk_l\rho_l}{Ee}}} \tag{4}$$

$$\frac{D(\rho u)}{Dt} = -\nabla P + \nabla \cdot \tau + \rho f_x + \beta \tag{5}$$

$$\frac{1}{c^2}\frac{P}{\partial t} + f_1(\varphi, x, t)\frac{\partial Q^*}{\partial x} f_2(x, t, \Delta \rho) = 0 \tag{6}$$

$$\frac{\partial Q^*}{\partial t} + \left(\frac{1}{f_1(\varphi, x, t)}\right)\frac{\partial P}{\partial x} + f_3(z, \varphi, t)) + f_4(Q^*, \varphi) = 0 \quad (7)$$

$$\frac{\partial T}{\partial t} + \frac{1}{A_0}\frac{\partial(QT)}{\partial t} = \frac{k}{\rho C_p}\left[\frac{\partial^2 T}{\partial x^2} + \frac{dA_c}{A_c dx}\frac{\partial T}{\partial x}\right] + U_\infty H\left(x\right)\left(\frac{P_i}{A_c}\right)(T_\infty - T)/\rho C_p \quad (8)$$

$$\frac{1}{c^2}\frac{\partial P}{\partial t} - + \frac{\partial(\rho u)}{\partial x} = \sigma \quad (9)$$

$$\frac{D(\rho u)}{Dt} + \frac{\partial P}{\partial x} + \frac{(\rho_l - \rho_v)^2 \rho_l f^*}{2D(\rho - \rho_v)}u|u| + \rho f_x - \beta = 0 \quad (10)$$

Wherein: p is density of the fluid, u is velocity, t is the time variable, and x is the spatial coordinate variable. $\beta$ represents loss of momentum in the liquid due to a leak or phase change, a represents loss of mass in the liquid due to a leak or phase change. Speed of sound or acoustic velocity by which transverse waves propagate through fluid filled pipeline is shown by c. Pipe young modulus of elasticity is shown by E, pipe outer diameter by D, pipe wall thickness by e and liquid bulk modulus of elasticity by k. The subscripts "1" and "v" as appear in any equation for example in equation (4) mean that it is "liquid" or "vapor" phase, i.e. means bulk modulus of elasticity of "liquid".

Other symbols common in equations are as follows:

Equation (1): The first term is the substantial derivative of the fluid density which consists of the two terms itself: temporal density changes with time and advective density changes with space. The divergence term can be combined with the advective term to form the flux conservative form of the continuity equation as is shown in equation (2). The second term of Equation (1) is density multiplied by "Divergence of the field of velocity".

Subscript "s" in Equation (3) means "isentropic". $c_p$ is specific heat coefficient at constant pressure, and $A_c$ is the cross-sectional area of the pipe and $P_f$ is perimeter element of area and $U_\infty$ is the overall heat transfer coefficient and k is the coefficient of thermal heat conduction transfer.

Equation (10) is the physical law of conservation of momentum. The last two terms consider the body forces due to gravity for non-horizontal profiles and residual momentums respectively (that could be non-zero if injection or losses are known to be likely to happen). Friction factor is shown by f*. Subscript "x" in $f_x$ means the body forces component in x-direction.

The detailed description of the four functional forms as appeared in Equations (6,7) are:

| Functional name | independent variables and functions |
| --- | --- |
| $f_1$ | Space, time and density |
| $f_2$ | Space, time and density margin to vapor |
| $f_3$ | Space, elvation |
| $f_4$ | Flowrate, friction factor and density |

| Description of functionals in the equations |
| --- |
| $f_1$: compressibility functional coefficient |
| $f_2$: interphase mass transfer functional term |
| $f_3$: Momentum losses correcting functional term |
| $f_4$: Momentum residual correcting functional term |

Equations (1) and (2) are conservation of mass equations. In the equations (1) and (2), the term $\sigma$ represents loss of mass in the liquid due to a leak or phase change. Conventional models do not include the term $\sigma$, and therefore cannot properly take into account or predict leaks or phase changes in the pipeline.

Equation (5) represent conservation of momentum. In equation (5), the term $\beta$ represents loss of momentum in the liquid due to a leak or phase change. Existing models do not include the term $\beta$, and therefore cannot properly take into account or predict leaks or phase changes in the pipeline.

Equation 10 represents conservation of energy. In equation (10), H(x) considers the change of insulation over the length of pipeline. Existing models do not include the term H(x).

Figure 2:
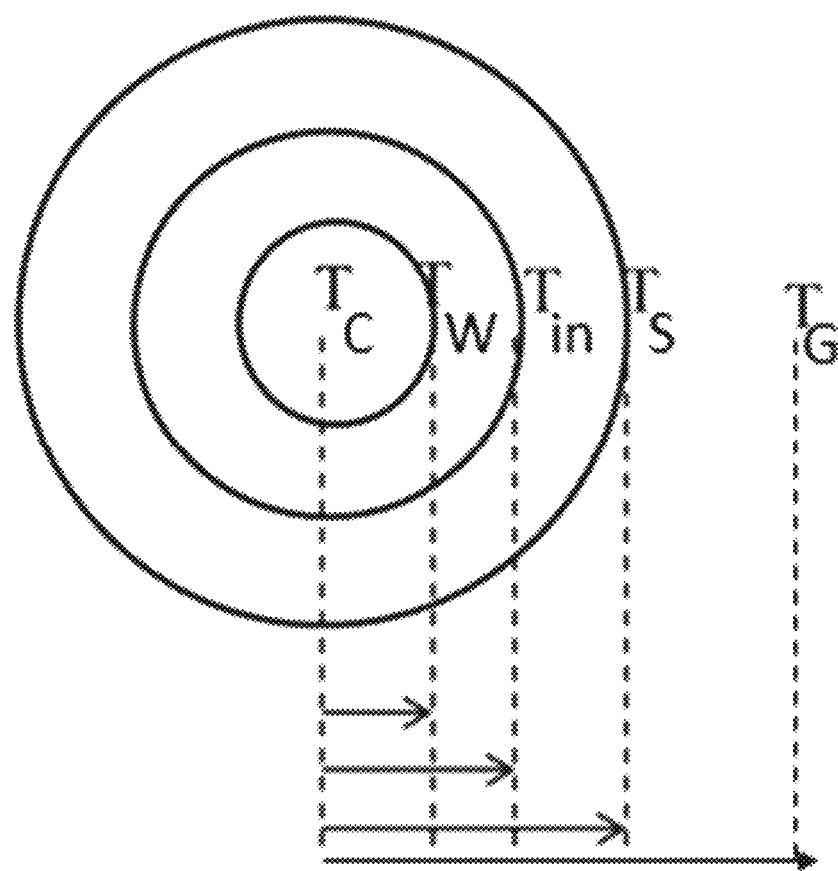
FIG. 2 illustrates a composite structure of a hydrocarbon transmission pipeline, according to example embodiments.

According to one embodiment, implementation of the energy equation to the model may be performed by first considering the composite structure of a typical hydrocarbon transmission pipeline. As shown in FIG. 2, from the core where the temperature is shown by $T_c$ to the ambient temperature which in this case is the ground temperature $T_G$ there are some other layers which are the wall thickness, insulation thickness and skin of the pipe (without lack of generality, the ambient temperature can be set to ground or atmosphere depending on the pipeline being buried in the ground or exposed to the atmosphere).

Figure 3:
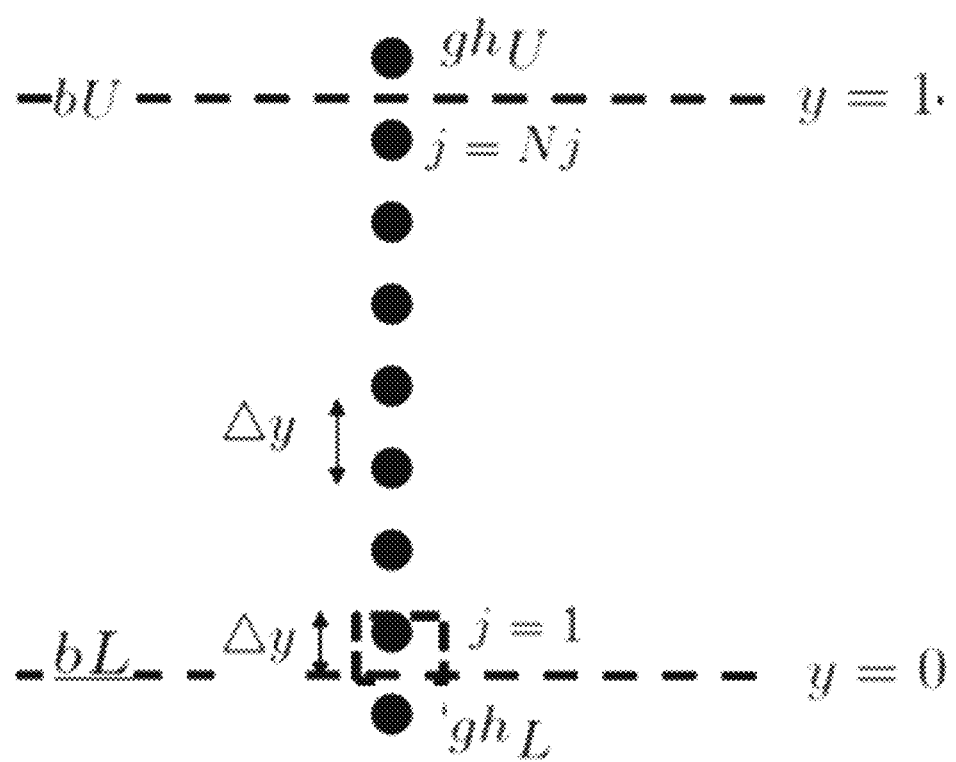
FIG. 3 illustrates implementation of a method of lines for discretization, according to example embodiments.

According to one embodiment, preparation of the model may include a selection of a discretization scheme. The discretization is referred to as the process of transferring continuous functions, models, variables, and equations into discrete counterparts. The matrix of coefficients is not diagonally dominant in order to be able to use the Crank-Nicolson method for full discretization. Other full discretization techniques may not be stable for all cases at all subzone parts, or near boundaries. So considering these limitations, the exemplary embodiments use method of lines which turned out to be robust, producing accurate results, as shown in FIG. 3.

According to the exemplary embodiments, preparing the model equations for numerical solution (MOL) is performed as follows. The basic idea of the MOL is to replace the spatial (boundary-value) derivatives in the Partial Differential Equation (PDE) with algebraic approximations. Once this is done, the spatially derivatives are no longer stated explicitly in terms of the spatial independent variables. Thus, in effect, only the initial-value variable (typically time in a physical problem) remains. In other words, with only one remaining independent variable, a system of Ordinary Differential Equations (ODEs) is produced that approximates the original PDE. The challenge, then, is to formulate the approximating system of the ODEs. Once this is done, any integration algorithm may be applied for the initial-value ODEs to compute an approximate numerical solution to the PDE. Thus, one of the salient features of the MOL is the use of existing well established numerical methods for ODEs.

The inputs of to the model are as follows:

| Property: |
| --- |
| Main pipeline Temperature |
| Pipe outer diameter |
| Pipe wall thickness |
| Hydrocarbon liquid density |
| Hydrocarbon vapor density |
| Hydrocarbon liquid viscosity |

-continued

| Property: |
|---|
| Hydrocarbon vapor viscosity |
| Speed of sound in the fluid |
| Pipeline length |
| Vapor Pressure |
| Pipe roughness |
| Fluid bulk modulus of elasticity |
| Pipe Young Modulus of elasticity |
| Ambient Pressure |

Note that previous approaches failed to address the problems mentioned above, as models had ignored certain problems and causes of slack. Furthermore, existing models had failed in terms of being real-time models of the pipeline when the pipeline operates transiently.

The approach addressing the issue of slack disclosed herein, advantageously, not only solves the above deficiencies, but via an algorithm-validation module, assures and ensures that the model maintains its real-time synchrony with the physical pipeline it simulates. The model of the exemplary embodiments explicitly calculates slack using its acoustically tuned model and does not break up when the pipeline goes from running to a shut-in condition or whether it is isothermal or not. The simulated model may use all pipeline properties and parameters including depth of burial, ground temperature, insulation patterns along the length. In other words, for any piece of pipeline-related data provided, there is an implantability that may be predicted within the model. In one embodiment, lack of some of fundamental parameters may be also predicted. The model may employ methods to overcome the lack of some of the fundamental parameters as discussed herein.

Overcoming of Zero-flow-Advection-Paradox may be performed as follows. In one embodiment, the model may predict standing waves in a pipeline transiently, so that using them the model can avoid the zero-velocity paradox. This paradox can be explained as follows: as the flow decelerates in a pipeline, the conventional approach is to prescribe zero velocity to all points along the length of the pipelines due to lack of ability in predicting the standing waves after shutting down. This approach may result in a wrong prediction of a location of a slack region and column separation. In other words, due to zero velocity assumptions, there will be no advective stream to raise the incepted bubbles from their cold region to highest point of elevation along the length of the pipeline.

The model is configured to deal with flexibility and uniqueness of the input data. The model may overcome unknown parameters paradox as follows:

All models need the speed of sound to predict their outputs. The approach of the present disclosure overcomes the unknown bulk modulus of elasticity and speed of sound. In fact, the exemplary model calculates these values from its mathematically built and trained Artificial Intelligence (AI) block. In other words, not only not having these parameters does not stop the model, but it becomes more precise over time with its mathematical built AI that uses machine learning. The model is and remains acoustically tuned via its algorithmic validation blocks. This ensures and assures that that the model keeps its real-time synchrony with the real pipeline which it simulates. Note that the model may not need viscosity for single commodity transmission pipelines while it is still needed for multi-batch products.

Existing RTTM CPM models do not have a way to ensure and assure their temporal and spatial predictions when it comes to slack operating conditions. The exemplary embodiments provide a comprehensive model configured for all types of causes leading to column separation (also known and referred to as slack). The model may be coupled with energy equation and capable of encapsulating isolated and non-isolated regions. The model uses an explicit parameter for column separation so that the deductions about whereabouts of the slack region comes directly from a designated parameter and not from extrapolations stemmed from interpretation of solutions of a system using less parameters. Note that most conventional models solve only for pressure and flow and then post argue to deduce or obtain or guess some values for T and slack.

The conventional methods may not know or may not precisely know all the hydraulic values and thermo-dynamical values (P, T, Q, p) along the length of the pipeline in real-time. The conventional mathematical models may process hydraulic values and thermo-dynamical values using paradigm of conventional methods known to be susceptible to errors and lack of synchrony with real-time pipeline. The following conventional models are susceptible to non-synchrony: GIVCM (Gas Interface Vapor Cavity Model), DVCM (Discrete Vapor Cavity Model) and DGCM (Discrete Gas Cavity Model).

Figure 4:
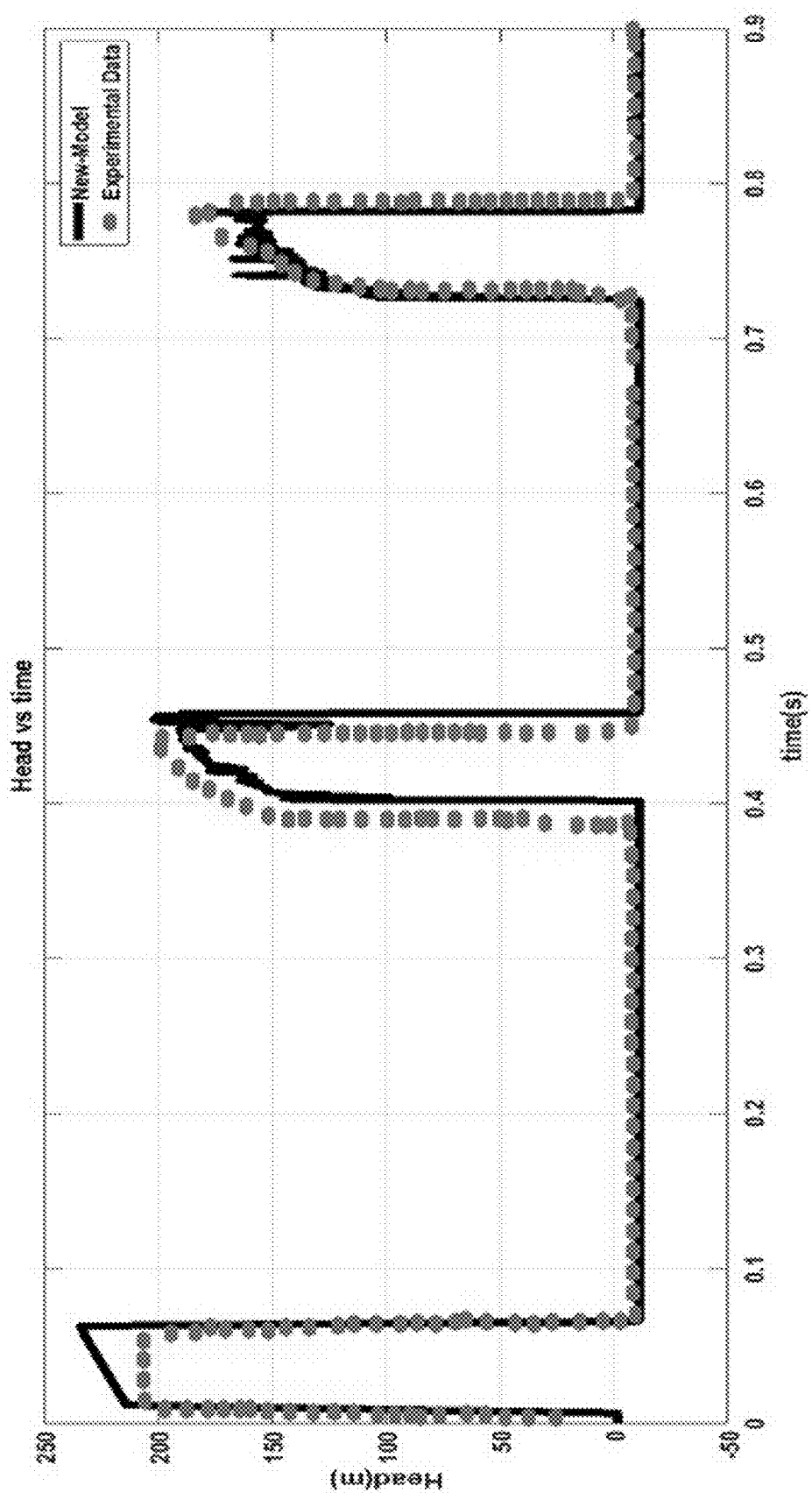
FIG. 4 shows that the exemplary model maintains its synchrony with the real pipeline which it simulates, according to example embodiments.
Figure 5:
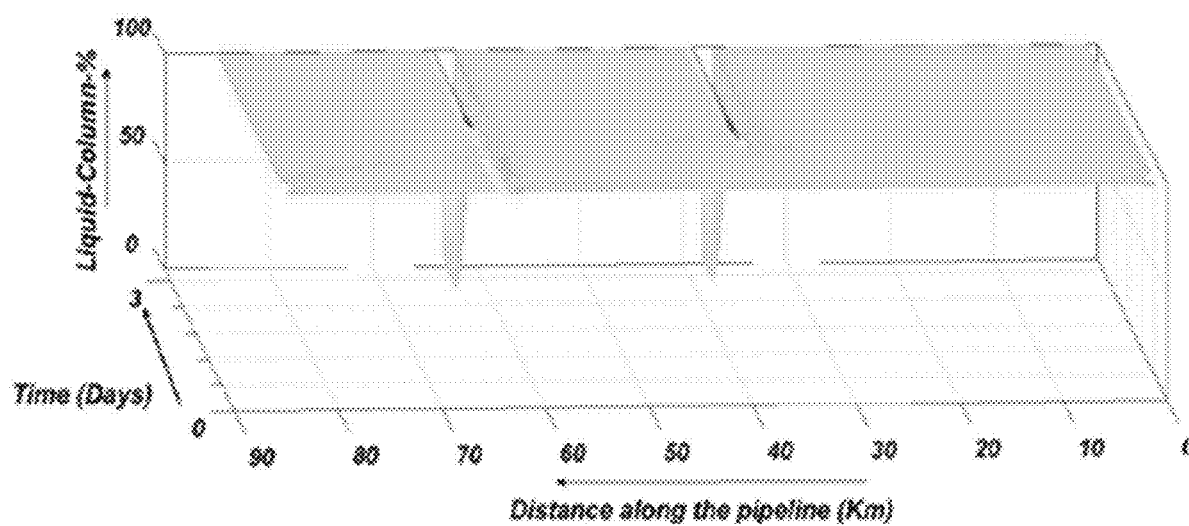
FIG. 5 illustrates that the model outputs the precise state of the secondary phase in real-time over the entire length of the pipeline, according to example embodiments.

In contrast, the proposed model includes an algorithm-validation block which always assures and ensures that the model keeps its synchrony with the real pipeline which it simulates, as seen in FIG. 4. The model, according to the exemplary embodiments, may output the precise state of the secondary phase in real-time over the entire length of the pipeline, as seen in FIG. 5. Thus, the model produces snapshots of the fluid's phase over the entire length of the pipeline. The model's output may include pressure, flow rate, and liquid hold-up at any time over the entire length of the pipeline.

In one embodiment, drops in liquid holdup can be examined more closely at specific locations over time (see FIG. 2) in order to identify naturally-occurring phase changes and phase-changes occurring because of a leak. Thus, false positive identifications of leaks can be avoided. In the example depicted in FIG. 1, the liquid hold-up at a certain location drops quickly just after 12:30 and rises quickly starting just before 19:00 and stabilizing just before 20:00. A technician viewing this profile can check whether at 12:30 the pipeline was shut and the reopened just before 19:00. If this is the case, the changes in the liquid-hold up are naturally occurring. If no changes in the operation of the pipe have occurred at the above-mentioned times, the changes in liquid hold-up did not occur naturally, but were caused by an undesirable condition, such as a leak.

According to the exemplary embodiments, a method, system and computer readable media for prediction of column separations in pipelines are provided. As discussed above, a comprehensive model is provided for all types of causes leading to column separation (also known and referred to as slack). The model is coupled with energy equation and capable of encapsulating isolated and non-isolated regions. The model may use an explicit parameter for column separation so that the deductions about whereabouts of the slack region comes directly from a designated parameter and not from extrapolations stemmed from interpretation of solutions of a system of less parameters. Column separation refers to the breaking of liquid columns in fully filled pipelines. This may occur in a water hammer event when the pressure drops to the vapor pressure at specific locations such as closed ends, high points or knees (changes in pipe slope).

In one example embodiment, the model may be generated by an AI module that may use training data sets to improve accuracy of the prediction of column separation. The parameters used in training data sets may be stored in a centralized database. In one embodiment, a neural network may be used for deriving the training data sets.

In one embodiment, the AI module may use a decentralized storage such as a blockchain that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as donating and collecting funds for a common charitable cause, but which do not fully trust one another.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Figure 6:
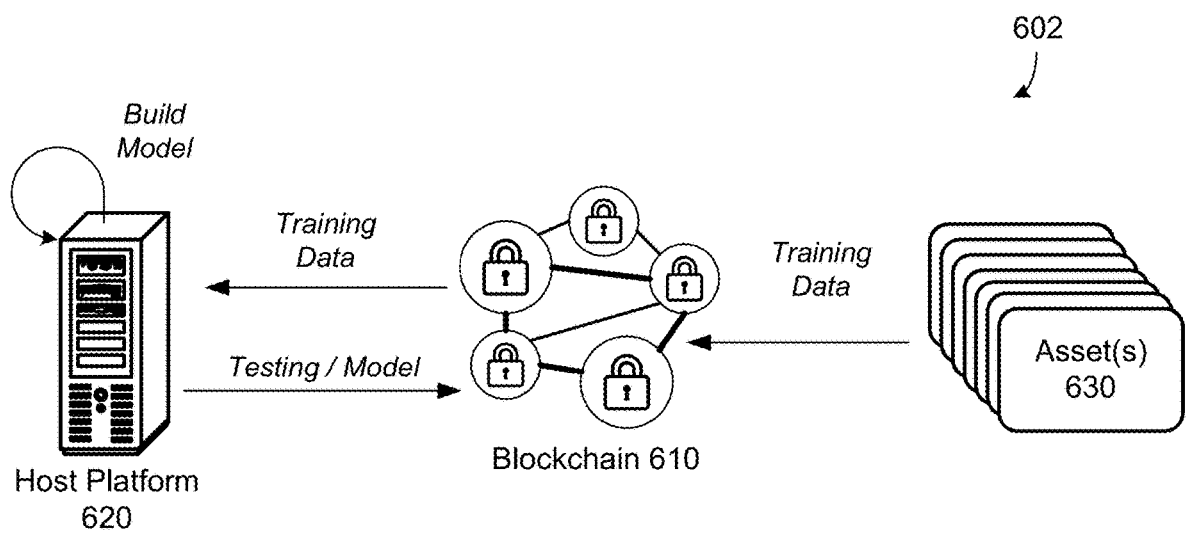
FIG. 6 illustrates an example of a blockchain which stores machine learning AI data, according to example embodiments.
Figure 6:
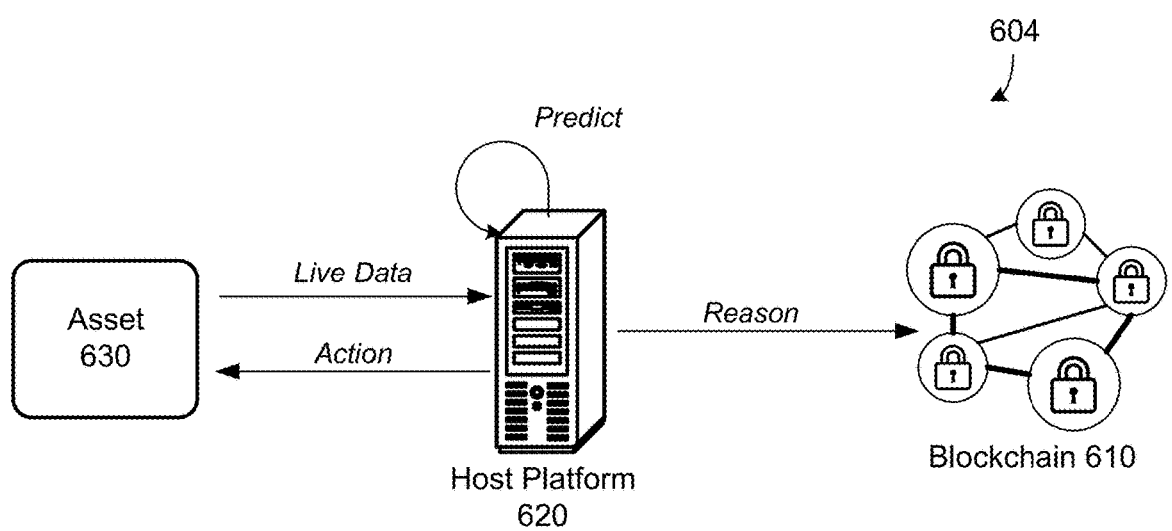

FIG. 6 illustrates an example 600 of a blockchain 610 which stores machine learning (AI) data. Machine learning relies on vast quantities of historical data (or training data) to build predictive models for accurate prediction on new data. Machine learning algorithm may sift through millions of records to unearth non-intuitive patterns based on data retrieved from neural networks or other sources.

In the example depicted in FIG. 6, a host platform 620 builds and deploys a machine learning model for predictive monitoring of assets 630. Here, the host platform 620 may be a cloud platform, an industrial server, a web server, a personal computer, a user device, and the like. Assets 630 can represent pipeline parameters.

The blockchain 610 can be used to significantly improve both a training process 602 of the machine learning model and a column separation predictive process 604 based on a trained machine learning model. For example, in 602, rather than requiring a data scientist/engineer or other user to collect the data, historical data may be stored by the assets 630 themselves (or through an intermediary, not shown) on the blockchain 610. This can significantly reduce the collection time needed by the host platform 720 when performing predictive model training. For example, using smart contracts, data can be directly and reliably transferred straight from its place of origin (e.g., from a pipeline monitoring utility) to the blockchain 610. By using the blockchain 610 to ensure the security and ownership of the collected data, smart contracts may directly send the data from the assets to the individuals that use the data for building a machine learning model. This allows for sharing of data among the assets 630.

The collected data may be stored in the blockchain 610 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices (e.g., pipeline parameter measuring devices and sensors) which write directly to the blockchain can increase both the frequency and accuracy of the data being recorded.

Furthermore, training of the machine learning model on the collected data may take rounds of refinement and testing by the host platform 620. Each round may be based on additional data or data that was not previously considered to help expand the knowledge of the machine learning model. In 602, the different training and testing steps (and the data associated therewith) may be stored on the blockchain 610 by the host platform 620. Each refinement of the machine learning model (e.g., changes in variables, weights, etc.) may be stored on the blockchain 610. This provides verifiable proof of how the model was trained and what data was used to train the model. Furthermore, when the host platform 620 has achieved a finally trained model, the resulting model may be stored on the blockchain 610.

After the model has been trained, it may be deployed to a live environment where it can make leak-related predictions/decisions based on the execution of the final trained machine learning model. In this example, data fed back from the asset 630 may be input into the machine learning model and may be used to make event predictions such as column separations and corresponding leaks in the pipeline. Determinations made by the execution of the machine learning model (e.g., locations of leaks etc.) at the host platform 620 may be stored on the blockchain 610 to provide auditable/verifiable proof. As one non-limiting example, the machine learning model may predict a future breakdown/failure to a part of the asset 630 and create alert or a notification to replace the part. The data behind this decision may be stored by the host platform 620 on the blockchain 610. In one embodiment the features and/or the actions described and/or depicted herein can occur on or with respect to the blockchain 610.

Figure 7A:
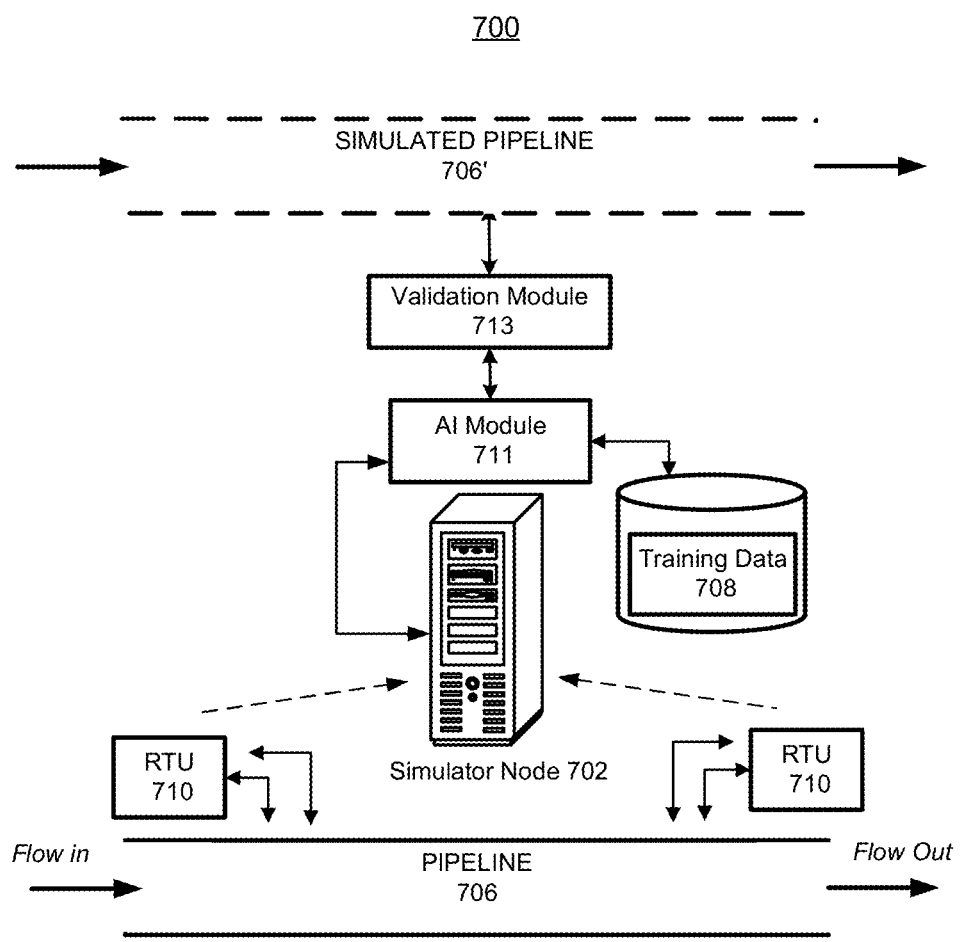
FIG. 7A illustrates a diagram of a pipeline simulation system including an AI module, according to example embodiments.

FIG. 7A illustrates a network diagram for simulation of a pipeline for prediction of column separations, according to example embodiments.

Referring to FIG. 7A, the example system 700 includes a simulator node 702 connected to remote terminal unit (RTUs) nodes 710 over a network (wired or wireless). The simulator node 702 may host or be connected to an AI module 711. The AI module 711 may be coupled to a data source for obtaining training data sets 708. As discussed above the data source may be a database, a blockchain or neural network or a combination thereof.

As discussed above, the example system 700 provides for a novel model generated by the AI module 711 based on parameters acquired from the pipeline 706 via the RTUs nodes 710. The model may accurately address the phase change temporally and spatially for the pipeline 706. The model may include a scalar binary function to facilitate the generalization of the energy equation for pipelines where energy transfer to or from the pipeline 706 occurs in real-time due to temperature differences between the pipeline 706 and its surroundings. The pipeline 706 may be buried in soil at different depths. The soil may have different thermal and mechanical properties such as temperature, porosity, granular size and may be exposed to ambient environment at different daily or seasonal temperatures.

The exemplary embodiments address the column separation during extended shut-in periods in the pipeline 706 which demands a non-isothermal approach to capture the evolution (not only inception) of column separation. The model produce by the AI module 711 uses an energy equation which is generalized to capture these effects and be included with the mass and momentum equations that have terms to allow for the interfacial mass transfer between the liquid and its vapor phase within the pipeline 706.

According to exemplary embodiments, a mathematical model is used to combine the governing equations of fluid flow based on a concept of predicting the flow rate, pressure, temperature and density at any given point of the pipeline 706 in real-time based on the real-time values of those parameters acquired at both ends of the pipeline 706 by the RTUs nodes 710. The predictions of this comprehensive model are not limited to specific type of operating conditions. In other words, all physical conditions that occur in the main real pipeline 706 are encapsulated for analysis within the simulated model pipeline 706'. In one embodiment, an algorithm-validation module 713 may be implemented on or connected to the simulator node 702. The algorithm-validation module 713 assures and ensures that the model (i.e., simulated pipeline 706') remains in real-time synchrony with the physical pipeline 706. The model of the system 700 explicitly calculates slack using its acoustically tuned model and does not break up when the pipeline goes from running to a shut-in condition or whether it is isothermal or not.

Figure 7B:
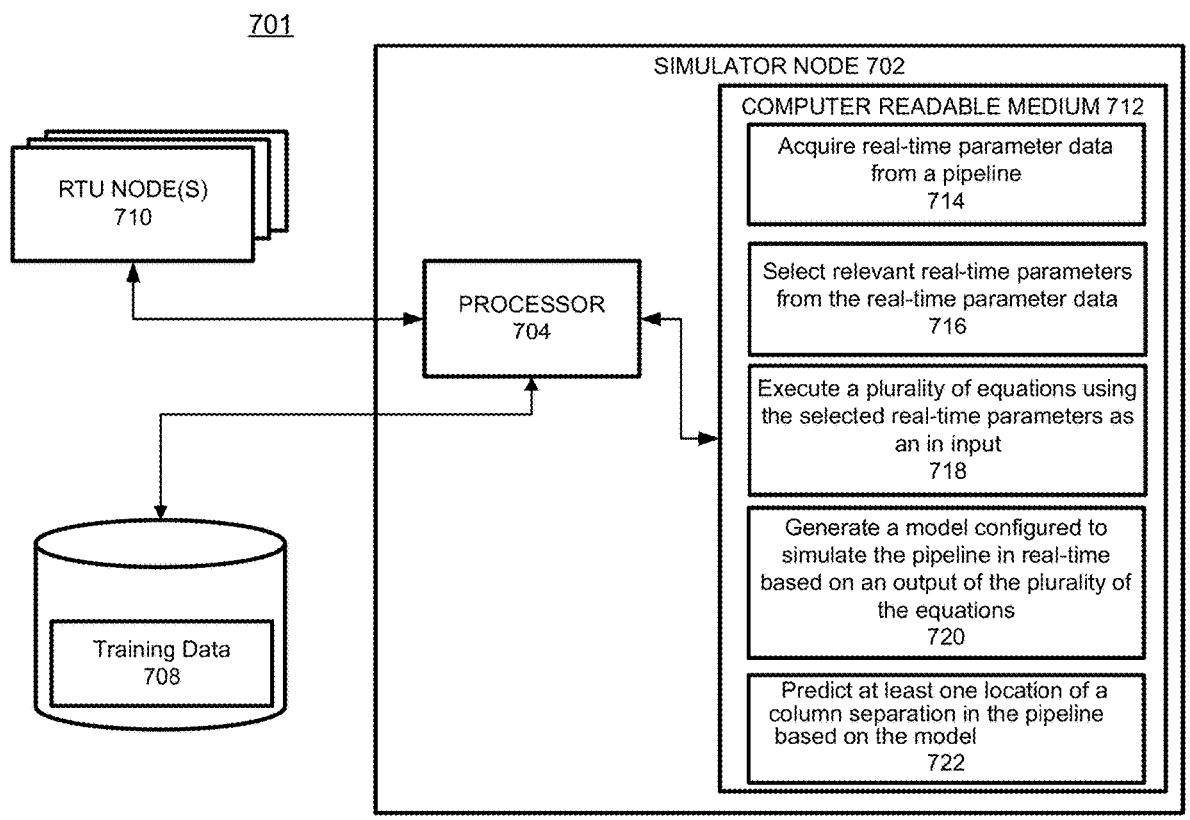
FIG. 7B illustrates a network diagram of a system including a detailed description of an simulator node, according to example embodiments.

FIG. 7B illustrates a network diagram of a system 701 including a detailed description of a simulator node, according to example embodiments. The simulator node 702 may include additional components and that some of the components described herein may be removed and/or modified without departing from a scope of the simulator node 702 disclosed herein. The simulator node 702 may be a computing device or a server computer, or the like, and may include a processor 704, which may be a semiconductor-based microprocessor, a central processing unit (CPU), an application specific integrated circuit (ASIC), a field-programmable gate array (FPGA), and/or another hardware device. Although a single processor 704 is depicted, it should be understood that the simulator node 702 may include multiple processors, multiple cores, or the like, without departing from the scope of the simulator node 702.

The simulator node 702 may also include a non-transitory computer readable medium 712 that may have stored thereon machine-readable instructions executable by the processor 704. Examples of the machine-readable instructions are shown as 714-722 and are further discussed below. Examples of the non-transitory computer readable medium 712 may include an electronic, magnetic, optical, or other physical storage device that contains or stores executable instructions. For example, the non-transitory computer readable medium 712 may be a Random Access Memory (RAM), an Electrically Erasable Programmable Read-Only Memory (EEPROM), a hard disk, an optical disc, or other type of storage device.

The processor 704 may execute the machine-readable instructions 714 to acquire real-time parameter data from a pipeline. The parameters may be acquired via RTUs nodes 710 located at the ends of the pipeline. The processor 704 may execute the machine-readable instructions 716 to select relevant real-time parameters from the real-time parameter data. The processor 704 may execute the machine-readable instructions 718 to execute a plurality of equations using the selected real-time parameters as an in input. The processor 704 may execute the machine-readable instructions 720 to generate a model configured to simulate the pipeline in real-time based on an output of the plurality of the equations. The processor 704 may execute the machine-readable instructions 722 to predict at least one location of a column separation in the pipeline based on the model.

Figure 8A:
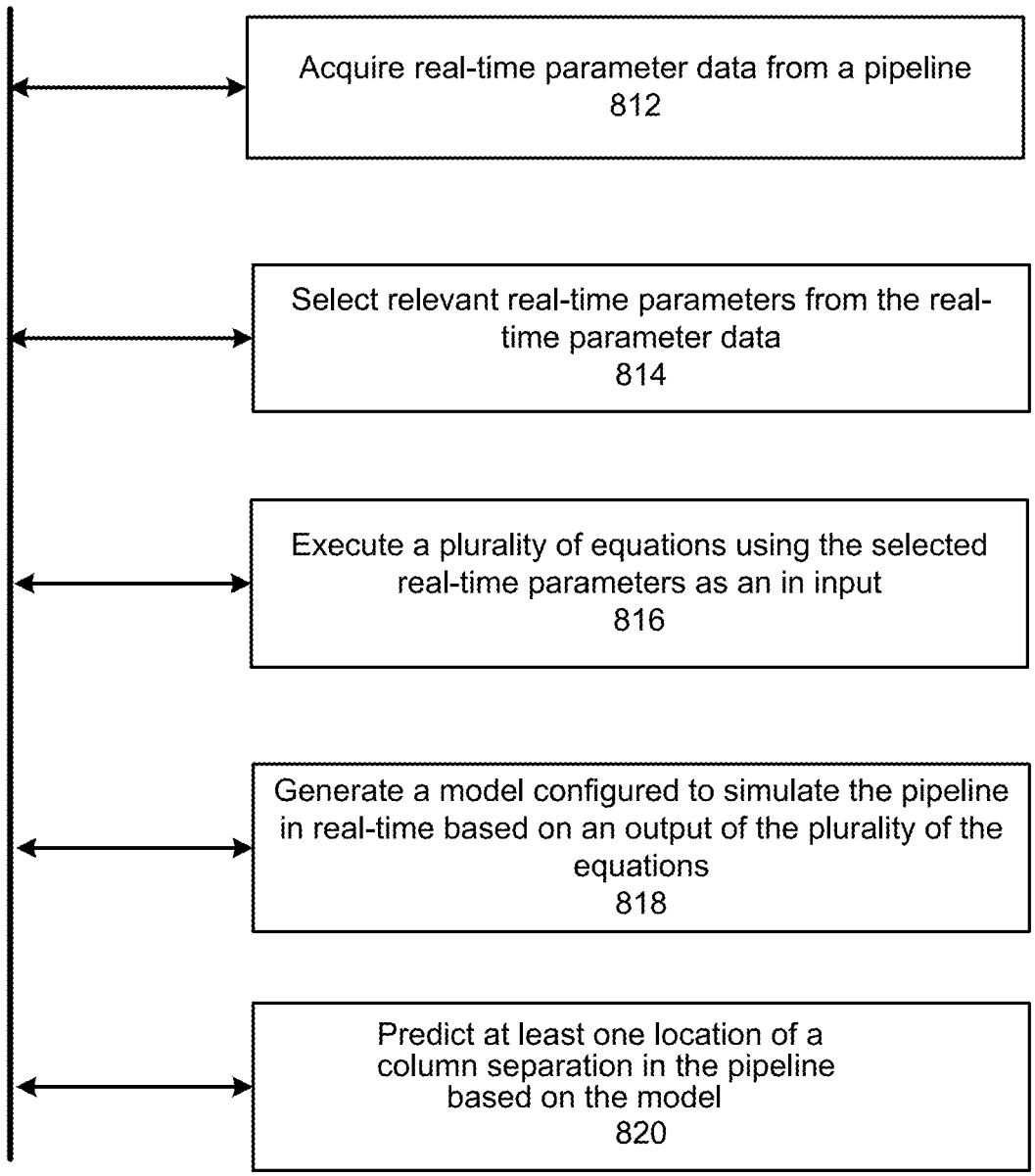
FIG. 8A illustrates a flow diagram, according to example embodiments.

FIG. 8A illustrates a flow diagram 800 of an example method of simulation of a pipeline for prediction of column separations, according to example embodiments. Referring to FIG. 8A, the method 800 may include one or more of the steps described below.

FIG. 8A illustrates a flow chart of an example method executed by the content processing node 702 (see FIG. 7B). It should be understood that method 800 depicted in FIG. 8A may include additional operations and that some of the operations described therein may be removed and/or modified without departing from the scope of the method 800. The description of the method 800 is also made with reference to the features depicted in FIG. 7B for purposes of illustration. Particularly, the processor 704 of the simulator node 702 may execute some or all of the operations included in the method 800.

With reference to FIG. 8A, at block 812, the processor 704 may generate the model configured to remain stable when the pipeline goes into a shut-in state. At block 814, the processor 704 may acquire real-time parameter data from a pipeline. At block 816, the processor 704 may select relevant real-time parameters from the real-time parameter data. At block 818, the processor 704 may execute a plurality of equations using the selected real-time parameters as an in input. At block 820, the processor 704 may generate a model configured to simulate the pipeline in real-time based on an output of the plurality of the equations. At block 822, the processor 704 may predict at least one location of a column separation in the pipeline based on the model.

Figure 8B:
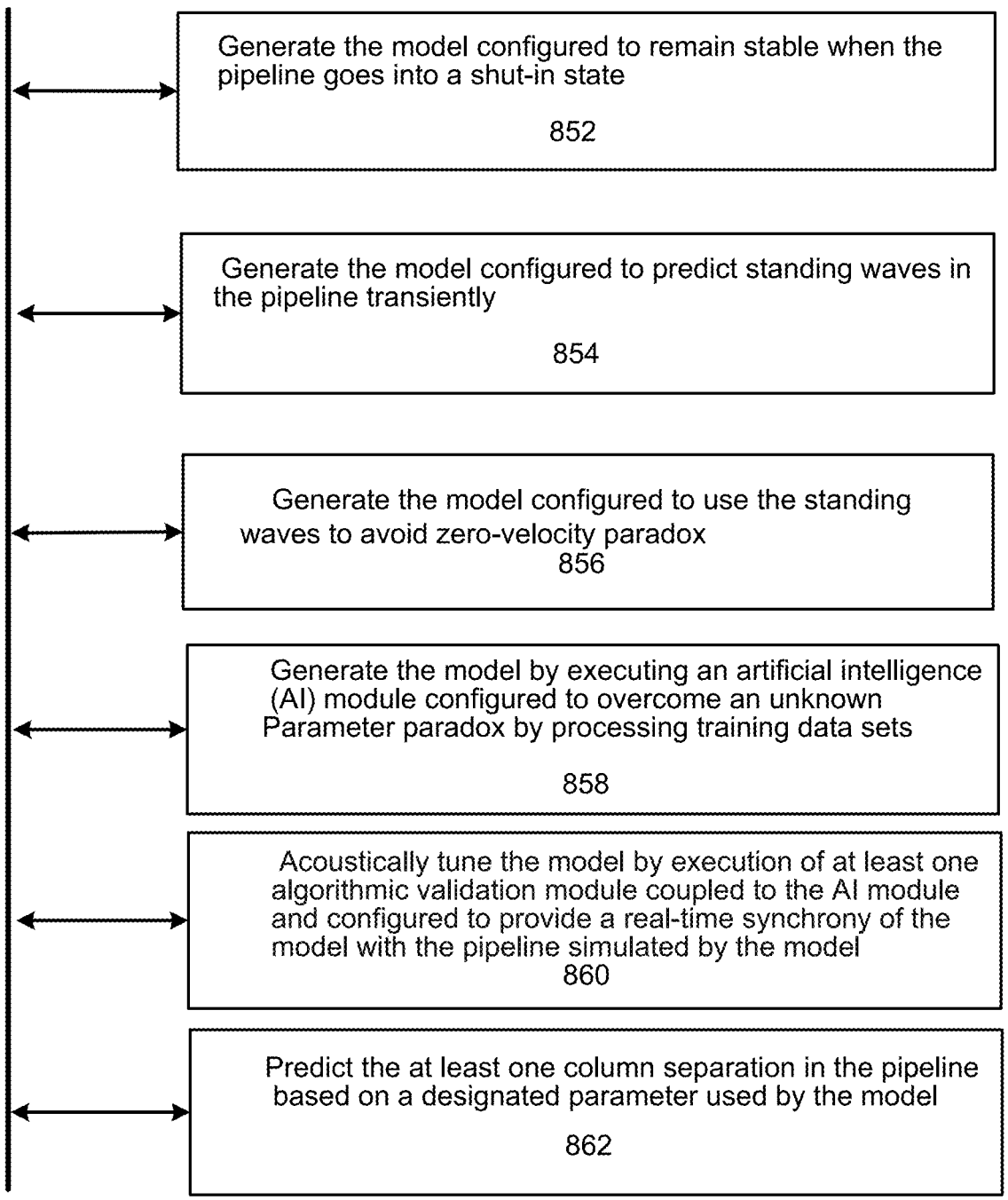
FIG. 8B illustrates a further flow diagram, according to example embodiments.

FIG. 8B illustrates a flow diagram 850 of an example method, according to example embodiments. Referring to FIG. 8B, the method 850 may also include one or more of the following steps. At block 852, the processor 704 may generate the model configured to remain stable when the pipeline goes into a shut-in state. At block 854, the processor 704 may generate the model configured to predict standing waves in the pipeline transiently. At block 856, the processor 704 may generate the model configured to use the standing waves to avoid zero-velocity paradox. At block 858, the processor 704 may generate the model by executing an artificial intelligence (AI) module configured to overcome an unknown parameter paradox by processing training data sets. At block 860, the processor 704 may acoustically tune the model by execution of at least one algorithmic validation module coupled to the AI module and configured to provide a real-time synchrony of the model with the pipeline simulated by the model. At block 862, the processor 704 may predict the at least one column separation in the pipeline based on a designated parameter used by the model.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 9:
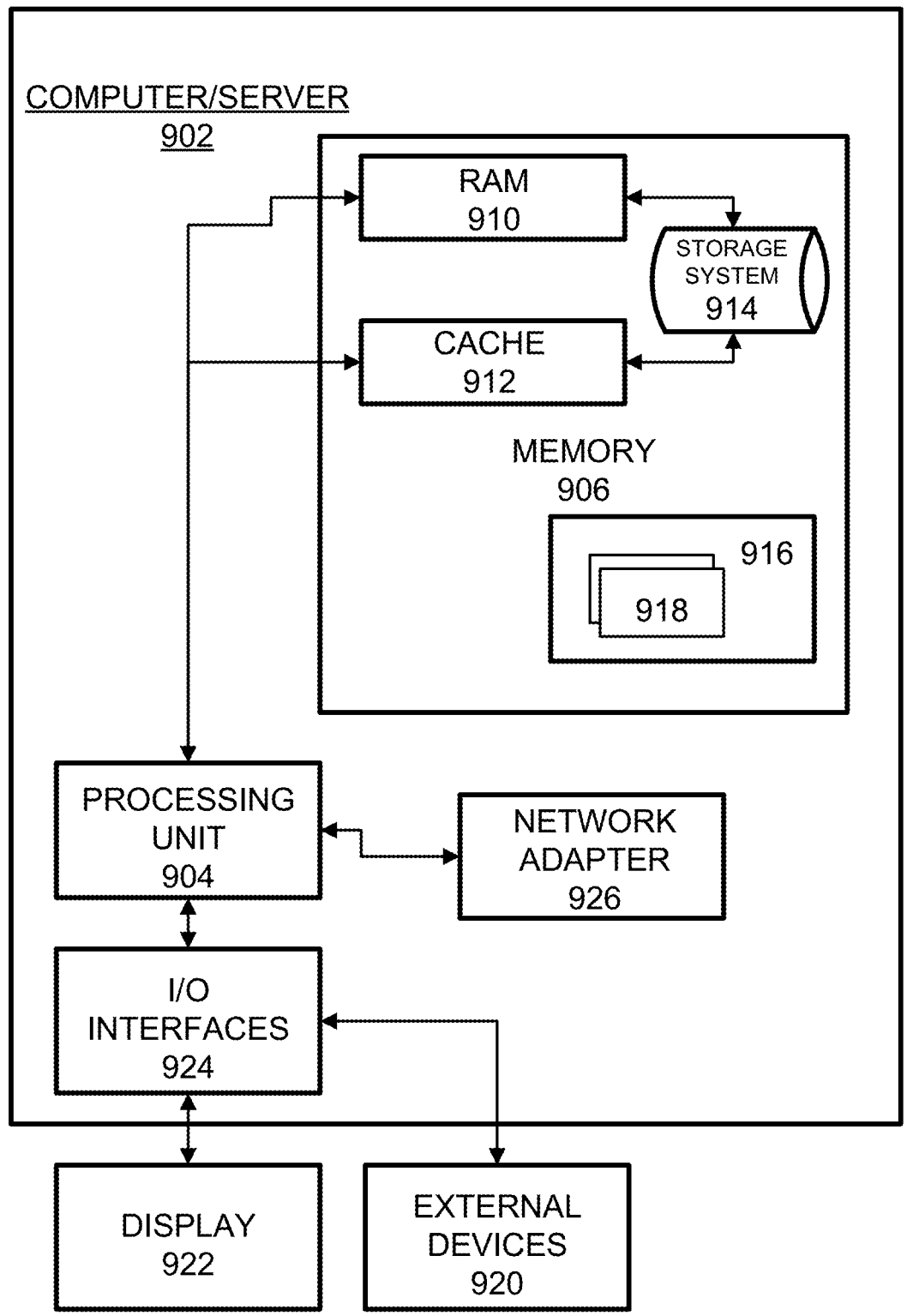
FIG. 9 illustrates an example simulator node that supports one or more of the example embodiments.

FIG. 9 illustrates an example simulator node 900 that supports one or more of the example embodiments described and/or depicted herein. The simulator node 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in the content processing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a processor of a simulator node;
a memory on which are stored machine-readable instructions that when executed by the processor, cause the processor to:
acquire real-time parameter data from a pipeline;
select relevant real-time parameters from the real-time parameter data;
execute a plurality of equations using the selected real-time parameters as an in input;
generate a model configured to simulate the pipeline in real-time based on an output of the plurality of the equations, wherein the model is generated by executing an artificial intelligence (AI) module configured to overcome an unknown parameter paradox by processing training data sets comprising the output of the plurality of the equations; and
predict at least one location of a column separation in the pipeline based on the model.

2. The system of claim 1, wherein the instructions further cause the processor to generate the model configured to remain stable when the pipeline goes into a shut-in state.

3. The system of claim 1, wherein the instructions further cause the processor to generate the model configured to predict standing waves in the pipeline transiently.

4. The system of claim 3, wherein the instructions further cause the processor to generate the model configured to use the standing waves to avoid zero-velocity paradox.

5. The system of claim 1, wherein the instructions further cause the processor to acoustically tune the model by execution of at least one algorithmic validation module coupled to the AI nodule and configured to provide a real-time synchrony of the model with the pipeline simulated by the model.

6. The system of claim 1, wherein the instructions further cause the processor to predict the at least one column separation in the pipeline based on a designated parameter used by the model.

7. A method, comprising:
acquiring, by a simulator node, real-time parameter data from a pipeline;
selecting, by the simulator node, relevant real-time parameters from the real-time parameter data;
executing, by the simulator node, a plurality of equations using the selected real-time parameters as an in input;
generating, by the simulator node, a model configured to simulate the pipeline in real-time based on an output of the plurality of the equations, wherein the model is generated by executing an artificial intelligence (AI) module configured to overcome an unknown parameter paradox by processing training data sets comprising the output of the plurality of the equations; and
predicting, by the simulator node, at least one location of a column separation in the pipeline based on the model.

8. The method of claim 7, further comprising generating the model configured to remain stable when the pipeline goes into a shut-in state.

9. The method of claim 7, further comprising generating the model configured to predict standing waves in the pipeline transiently.

10. The method of claim 9, further comprising generating the model configured to use the standing waves to avoid zero-velocity paradox.

11. The method of claim 7, further comprising acoustically tuning the model by execution of at least one algorithmic validation module coupled to the AI module and configured to provide areal-time synchrony of the model with the pipeline simulated by the model.

12. The method of claim 7, further comprising predicting the at least one column separation in the pipeline based on a designated parameter used by the model.

13. A non-transitory computer readable medium comprising instructions, that when read by a processor, cause the processor to perform:
acquiring real-time parameter data from a pipeline;
selecting relevant real-time parameters from the real-time parameter data;
executing a plurality of equations using the selected real-time parameters as an in input;
generating a model configured to simulate the pipeline in real-time based on an output of the plurality of the equations, wherein the model is generated by executing an artificial intelligence (AI) module configured to overcome an unknown parameter paradox by processing training data sets comprising the output of the plurality of the equations; and
predicting at least one location of a column separation in the pipeline based on the model.

14. The non-transitory computer readable medium of claim 13, further comprising instructions, that when read by the processor, cause the processor to generate the model configured to simulate the pipeline going into a shut-in state.

15. The non-transitory computer readable medium of claim 13, further comprising instructions, that when read by the processor, cause the processor to generate the model configured to predict standing waves in the pipeline transiently for avoiding zero-velocity paradox.

16. The non-transitory computer readable medium of claim 13, further comprising instructions, that when read by the processor, cause the processor to acoustically tune the model by execution of at least one algorithmic validation module coupled to the AI module and configured to provide a real-time synchrony of the model with the pipeline simulated by the model.

17. The non-transitory computer readable medium of claim 13, further comprising instructions, that when read by the processor, cause the processor to predict the at least one column separation in the pipeline based on at least one designated parameter used by the model.

* * * * *